(12) United States Patent
Bakk (10) Patent No.: US 12,167,520 B2
(45) Date of Patent: Dec. 10, 2024

(54) METHOD FOR MONITORING THE DENSITY AND/OR THE MOVEMENT OF HUMANS

(71) Applicant: Tridonic GmbH & Co KG, Dornbirn (AT)

(72) Inventor: Istvan Bakk, Torokbalint (HU)

(73) Assignee: Tridonic GmbH & Co KG, Dornbirn (AT)

( * ) Notice: Subject to any disclaimer, the term of this patent is extended or adjusted under 35 U.S.C. 154(b) by 233 days.

(21) Appl. No.: 17/910,127

(22) PCT Filed: Mar. 11, 2021

(86) PCT No.: PCT/EP2021/056183
§ 371 (c)(1),
(2) Date: Sep. 8, 2022

(87) PCT Pub. No.: WO2021/180847
PCT Pub. Date: Sep. 16, 2021

(65) Prior Publication Data
US 2023/0124738 A1    Apr. 20, 2023

(30) Foreign Application Priority Data
Mar. 11, 2020 (EP) .................................. 20162401

(51) Int. Cl.
*H05B 47/115* (2020.01)
*H05B 47/155* (2020.01)
(Continued)

(52) U.S. Cl.
CPC ......... *H05B 47/115* (2020.01); *H05B 47/155* (2020.01); *H05B 47/165* (2020.01); *H05B 47/19* (2020.01)

(58) Field of Classification Search
None
See application file for complete search history.

(56) References Cited

U.S. PATENT DOCUMENTS

| | | | |
|---|---|---|---|
| 2012/0062123 A1* | 3/2012 | Jarrell | H05B 47/11 315/131 |
| 2019/0056131 A1* | 2/2019 | Warren | F24F 11/30 |

(Continued)

FOREIGN PATENT DOCUMENTS

| | | |
|---|---|---|
| WO | 2017108374 A1 | 6/2017 |
| WO | 2019115599 A1 | 6/2019 |

OTHER PUBLICATIONS

PCT/EP2021/056183, International Search Report and Written Opinion dated Aug. 25, 2021, 19 pages.

*Primary Examiner* — Wilson Lee
(74) *Attorney, Agent, or Firm* — Andrus Intellectual Property Law, LLP (57) ABSTRACT

The invention relates to a method (20) for monitoring the density and the movement of humans using a grid (100) of a plurality of luminaires (101a-d), each of the luminaires (101a-d) comprising an acoustic sensor (105), a motion sensor (107), preferably a Doppler sensor, a controller (109) supplied with output signals of said sensors (105, 107), and a wireless interface (111) for a communication between the controller (109) and a gateway (401) for forwarding sensor information signals (130) to a central database (403), wherein, based on the information in the database (403), the density and/or the movement of humans in an area covered by the grid (100) is estimated by generating a time series of sensor values, such as sound pressure, motion speed and/or motion intensity, of each luminaire (101a-d).

9 Claims, 5 Drawing Sheets

(51) Int. Cl.
*H05B 47/165* (2020.01)
*H05B 47/19* (2020.01)

(56) References Cited

U.S. PATENT DOCUMENTS

2020/0170093 A1* 5/2020 Mirsky .................. F21S 8/085
2020/0263863 A1* 8/2020 Trivelpiece ............ H05B 47/19

* cited by examiner

METHOD FOR MONITORING THE DENSITY AND/OR THE MOVEMENT OF HUMANS

CROSS REFERENCE TO RELATED APPLICATIONS

The present application is the U.S. national stage application of international application PCT/EP2021/056183 filed Mar. 11, 2021, which international application was published on Sep. 16, 2021 as International Publication WO 2021/180847 A1. The international application claims priority to European Patent Application No. 20162401.2 filed Mar. 11, 2020.

TECHNICAL FIELD OF THE INVENTION

The invention relates to method and a system for monitoring the density and/or the movement of humans in an area.

BACKGROUND OF THE INVENTION

Many environments, such as buildings, comprise a large grid of luminaires which are distributed in the environment to ensure that every place in the environment can be illuminated adequately, e.g. every room in the building.

It is known to additionally arrange various types of sensors, e.g. motion sensors or noise sensors, in such an environment to collect environmental information, e.g. information about the presence or distribution of people in the environment. This information can be used to control the luminaire grid.

However, it is difficult and costly to distribute, network and power a sufficient number of different environmental sensors in parallel to the luminaire grid.

In addition, many environments, especially public areas, comprise spaces where many people are present at the same time. For optimizing a utilization and layout of such spaces, for instance the operation of HVAC (heating, ventilation and air conditioning) systems, it is important to know the typical density of people in these environments, for instance a typical noise or motion density.

It is known to use imaging systems, such as cameras, to monitor the density of people in an environment. However, cameras are often perceived as invasive to the privacy of the people in the environment and are therefore not widely accepted. Further, such systems can lead to high costs due to a need for regular commissioning and maintenance.

Thus, it is an objective of the invention to provide an improved method for monitoring the density and/or the movement of humans and an improved system comprising a grid of luminaires, which avoid the above-mentioned disadvantages. In particular, it is an objective to provide an efficient and non-invasive method for monitoring the density and/or movement of people in an area.

SUMMARY OF THE INVENTION

The object of the present invention is achieved by the solution provided in the enclosed independent claims. Advantageous implementations of the present invention are further defined in the dependent claims.

According to a first aspect of the invention relates to a method for monitoring the density and/or the movement of humans using a grid of a plurality of luminaires, each of the luminaires comprising an acoustic sensor, a motion sensor, preferably a Doppler sensor, a controller supplied with output signals of said sensors, and a preferably wireless interface for a communication between the controller and a gateway for forwarding sensor information signals to a central database, wherein, based on the information in the database, the density and/or the movement of humans in an area covered by the grid is estimated by generating a time series of sensor values, such as sound pressure, motion speed and/or motion intensity, of each luminaire.

This achieves the advantage that the density and movement of humans in the area can be monitored efficiently in a non-invasive way.

Integrating the sensors in each luminaire of the grid, allows collecting sensor data from various places in the environment simultaneously. By evaluating this data, information about the density and movement of the people throughout the area can be gained. Integrating the sensors in the luminaires of the grid further leads to cost reductions, because components such as housing, communication means and/or power sources can be shared between the luminaires and the sensors.

However, in particular, no individualized or otherwise privacy related data is obtained and stored. This is, for example, achieved by only forwarding isolated sensor values, e.g. a noise amplitude or level every few seconds.

Preferably, the density and/or the movement of humans in an area covered by the grid is estimated based on sensor readings, e.g. signal amplitudes, and not only on Boolean triggers, such as 0 or 1, e.g., to indicate a high or low sound level.

The area can comprise an office building, in particular work or meeting areas, or a public place, such as a restaurant.

The output signals received by the controller may refer to the sensor values/readings that are outputted by the sensors, i.e. the amplitude. The sensor information signals can inter alia comprise the output signals of the sensors.

In an embodiment, the controller is arranged for forwarding the sensor information signals repetitively with a constant or a varying, especially adaptive, frequency.

This achieves the advantage that a temporal development of the density and movement of the people in the area can be detected. In this way, for instance, it can be detected how the density of people changes during the day.

In an embodiment, said sensor information signals comprise a timestamp, a luminaire identifier (ID) and a sensor value.

This achieves the advantage that a detected density of people can be linked to a certain time.

Preferably, the sensor information signals comprise one or more timestamps, luminaire identifiers and sensor values.

In an embodiment, the sensor value represents an amplitude of the output signal, in particular of one or more output signals, at the time of the associated timestamp.

This achieves the advantage that sensor values that are sufficient to detect the people density or movement can be forwarded to the database. In particular, only isolated sensor values, e.g. a noise level every few seconds, are forwarded, but, for instance, no audio recordings that could be seen as invasive to the privacy of people in the environment. Forwarding only isolated sensor values also has the additional advantage that the interface can operate with low bandwidth.

In an embodiment, said sensor information signals are forwarded using the Bluetooth standard.

The sensor information signals can comprise the sensor values.

Preferably, the density and/or the movement of humans in the area covered by the grid are estimated by: generating a time series of sensor information signals, in particular of sensor values, such as sound pressure, motion speed and/or motion intensity, of each luminaire.

This achieves the advantage that density and/or the movement of the humans in the area ca be estimated efficiently based on the change of sensor values over time.

The time series can be generated based on sensor values and corresponding timestamps in the sensor information signals.

Preferably, such a time series is generated for each luminaire of the grid, which can be distinguished by their respective luminaire ID.

In an embodiment, the density and/or the movement of humans in the area covered by the grid are estimated by: determining probabilities that the sensor information signals stored in the database comprise human voice and/or multiples of human voices, for example crowd chatter, and generating a further time series of the probabilities of human voice and/or multiples of human voices.

This achieves the advantage that density and/or the movement of the humans in the area ca be estimated efficiently based on probabilities of human chatter and its change over time.

In an embodiment, the method further comprises: applying an averaging algorithm, convolution algorithm, smoothing algorithm, or low pass filter on the time series and/or the further time series.

This achieves the advantage, that the accuracy of the time series can be improved by removing unwanted noise.

In an embodiment, the method further comprises: applying an anomaly detection algorithms on the time series and/or the further time series, in particular after applying the smoothing algorithm on the respective time series, to detect outlying data.

This achieves the advantage, that the accuracy of the time series can be improved by removing outlying data.

In an embodiment, the method further comprises determining a peoples density probability and/or an estimate on the number of people in the area covered by the grid, in particular in an area covered by each luminaire, based on the time series and/or on the further time series.

This achieves the advantage that the peoples density probability and/or an estimate on the number of people can be determined efficiently.

According to a second aspect, the invention relates to a system comprising a grid of luminaires, a gateway and a database, wherein the grid comprises a plurality of luminaires, each of the luminaires comprising an acoustic sensor, a motion sensor, preferably a Doppler sensor, a controller which is configured to receive output signals from said sensors, and a preferably wireless interface for a communication between the controller and the gateway for forwarding sensor information signals to the database, wherein based on the information in the database the density and/or the movement of humans in an area covered by the grid is estimated by generating a time series of sensor values, such as sound pressure, motion speed and/or motion intensity, of each luminaire.

This achieves the advantage that the density and movement of humans in the area can be monitored efficiently in a non-invasive way.

Integrating the sensors in each luminaire of the grid, allows collecting sensor data from various places in the environment simultaneously. By evaluating this data, information about the density and movement of the people throughout the area can be gained. Integrating the sensors in the luminaires of the grid further leads to cost reductions, because components such as housing, communication means and/or power sources can be shared between the luminaires and the sensors.

In an embodiment, the database can be analyzed for evaluating the time development of one or more sensor information signals.

This achieves the advantage that a temporal development of the density and movement of humans at different places in the area can be determined. In this way, for instance, it can be determined how the density of humans in the area of the grid changes over the day.

Preferably, the database is adapted for being analyzed for evaluating the time development of one or more sensor information signals.

The system can comprise a data processing unit. The data processing unit can be configured to analyze the database and to evaluate the time development of one or more sensor information signals based on this analysis.

In an embodiment, the database can be analyzed for evaluating correlations between sensor information signals of sensors of different categories and/or different luminaires.

This achieves the advantage that the system has a high robustness, e.g. faulty sensor signals can be detected via comparison with signals from other sensors. In addition, this sensor fusion, i.e. the combination of different types of sensor signals from different sensors, allows determining additional information about the environment with low uncertainty.

Preferably, the database is adapted for being analyzed for evaluating correlations between sensor information signals of sensors of different categories and/or different luminaires.

The data processing unit can be configured to analyze the database and to evaluate the correlations between sensor information signals of sensors of different categories and/or different luminaires based on this analysis.

The above description with regard to the method for monitoring the density and/or movement of humans according to the first aspect of the invention is correspondingly valid for the system according to the second aspect of the invention.

BRIEF DESCRIPTION OF THE DRAWINGS

The invention will be explained in the followings together with the figures.

DETAILED DESCRIPTION OF THE PREFERRED EMBODIMENTS

The present invention is described more fully hereinafter with reference to the accompanying drawings, in which various aspects of the present invention are shown. This invention however may be embodied in many different forms and should not be construed as limited to the various aspects of the present invention presented through this disclosure. Rather, these aspects are provided so that this disclosure will be thorough and complete, and will fully convey the scope of the present invention to those skilled in the art. The various aspects of the present invention illustrated in the drawings may not be drawn to scale. Rather, the dimensions of the various features may be expanded or reduced for clarity. In addition, some of the drawings may be simplified for clarity. Thus, the drawings may not depict all of the components of a given apparatus.

It is further understood that the aspect of the present invention might contain integrated circuits that are readily manufacturable using conventional semiconductor technologies, such as complementary metal-oxide semiconductor technology, short "CMOS". In addition, the aspects of the present invention may be implemented with other manufacturing processes for making optical as well as electrical devices. Reference will now be made in detail to implementations of the exemplary aspects as illustrated in the accompanying drawings. The same references signs will be used throughout the drawings and the following detailed descriptions to refer to the same or like parts.

Figure 1A:
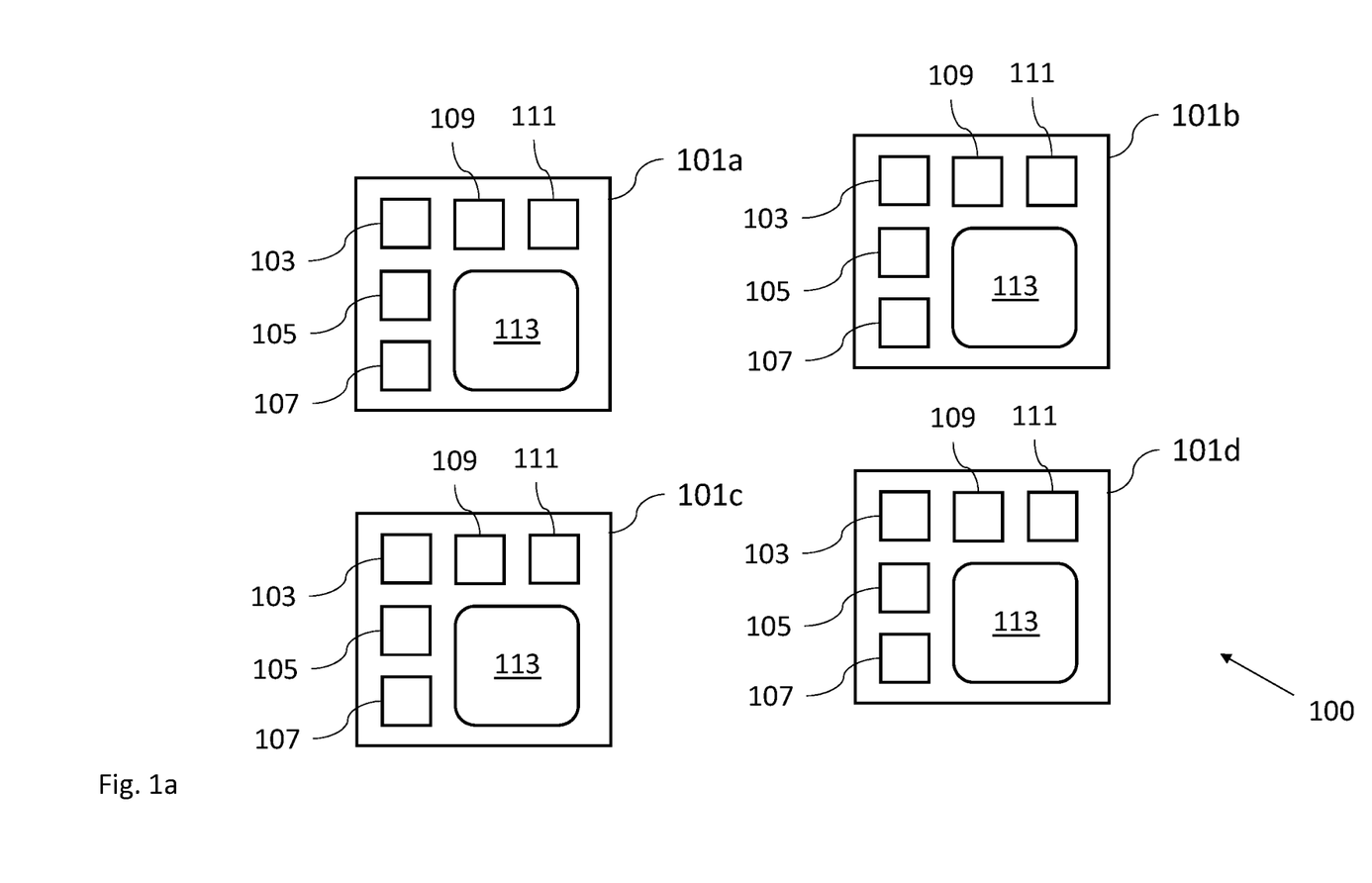
FIG. 1a shows a schematic diagram of a grid of a plurality of luminaires according to an embodiment.

FIG. 1a shows a schematic diagram of a grid of a plurality of luminaires according to an embodiment.

Each of the luminaires 101a-d in the grid 100 comprises an acoustic sensor 105, a motion sensor 107, preferably a Doppler sensor, a controller 109 supplied with the output signals of said sensors 103, 105, 107, and a wireless interface 111 for a communication between the controller 109 and a gateway for forwarding sensor information signals to a central database (not shown in FIG. 1a).

In particular, each luminaire 101a-d of the grid 100 is a sensor luminaire, which comprises the acoustic sensor 105 and the motion sensor 107.

Optionally, each luminaire can further comprise a light sensor 103, in particular a daylight sensor.

The grid 100 can be arranged in an environment, in particular a public area or a building. Since the luminaires 101a-d are typically evenly distributed over such an environment, equipping each luminaire 101a-d with sensors 103, 105, 107 leads to a good coverage of the environment with the sensors. Equipping luminaires with sensors has the additional advantage that no extra planning or commissioning for mounting external sensors in the environment has to be done.

Preferably, the wireless interface 111 is configured to communicate with the gateway (not shown), in particular to forward the sensor information signals to the gateway. The gateway can be a wireless gateway.

Preferably, each luminaire 101a-d in the grid 100 comprises a light source 113, in particular a plurality of LEDs.

Each of the luminaires 101a-d can be a downlight luminaire, a linear luminaire, an area light or a multi-purpose light. In particular, the grid 100 comprises different types of luminaires at different locations in the environment.

The controller 109 can be a micro controller unit (MCU).

Preferably, the controller 109 of each luminaire 101a-d is arranged for forwarding the sensor information signals repetitively with a constant or a varying, especially adaptive, frequency. In particular, the controller 109 is configured to control the wireless interface 111 to forward the sensor information signals.

Preferably, the wireless interface 111 of each luminaire 101a-d comprises a Bluetooth interface.

The acoustic sensor 105 of the luminaires 101a-d can comprise a noise detector, in particular a microphone. For example, the acoustic sensor 105 is configured to detect a noise pressure level and/or noise patterns such as voice or burst sounds.

The motion sensor 107 can be a Doppler sensor, i.e. a sensor that detects motion based on the Doppler Effect. In particular, the motion sensor 107 is configured to detect a motion intensity.

Preferably, the sensors 103, 105, 107 and the controller 109 and the interface 111 are arranged within a housing (not shown) of the luminaire 101a-d, e.g. below a diffusing plate. In this way, the sensors are not protruding the visible interface and do not disturb the appearance of the luminaire.

The grid 100 can comprise multiple luminaires 101a-d equipped with the same type and number of sensors. Alternatively, luminaires 101a-d of one grid 100 may comprise different sensors.

Figure 1B:
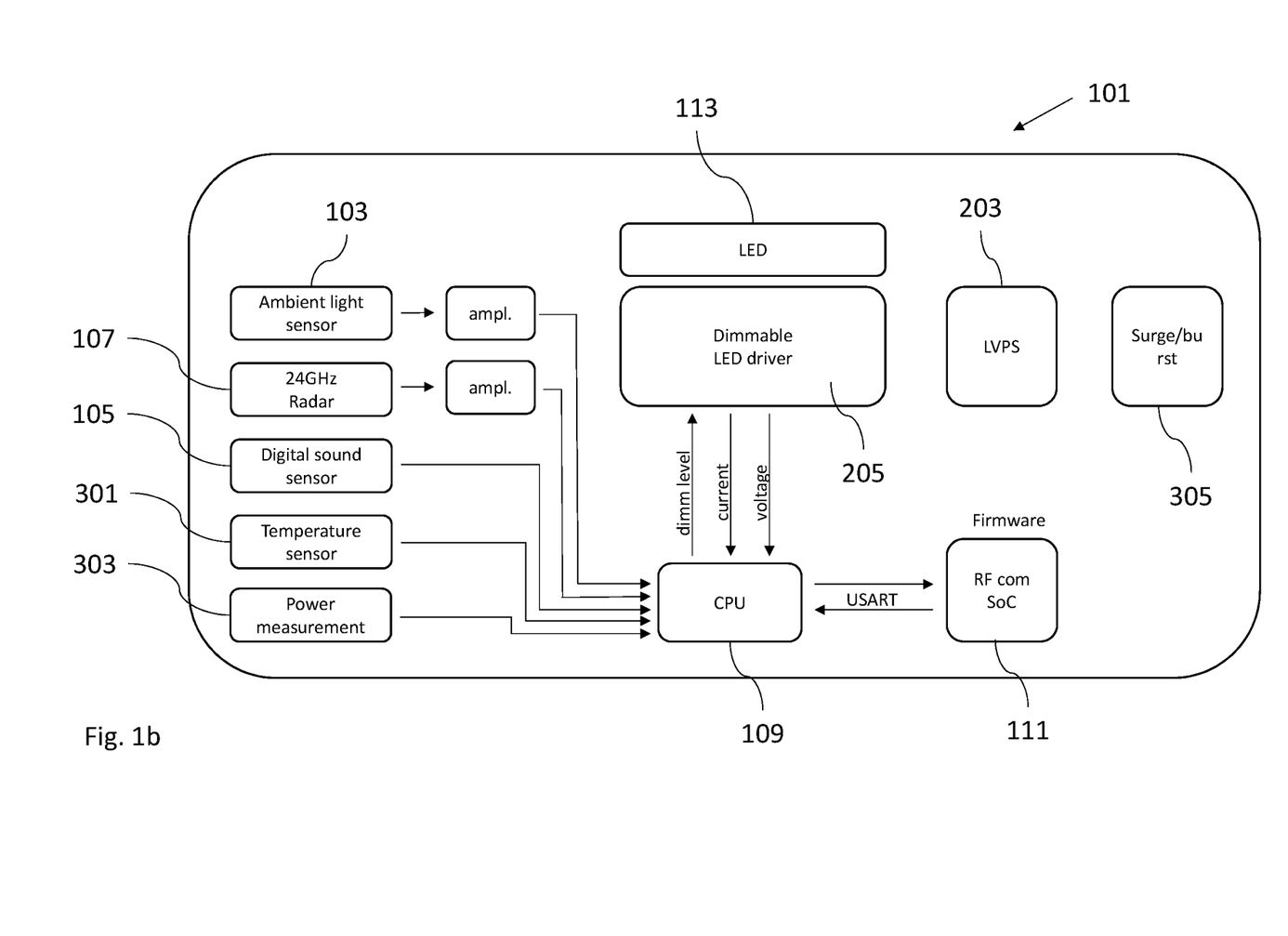
FIG. 1b shows a schematic diagram of a luminaire according to an embodiment.

FIG. 1b shows a schematic diagram of a luminaire 101 according to an embodiment.

In particular, the luminaire 101 shown in FIG. 1b is an exemplary embodiment of a luminaire 101a-b of the grid 100, as for example shown in FIG. 1a.

The luminaire 101 comprises the light sensor 103, the motion sensor 107, e.g. in form of a 24 GHz radar sensor, and the acoustic sensor 105, e.g. in form of a digital sound sensor.

The luminaire 101 can further comprises a temperature sensor 301 and a power measurement unit 303, e.g. for measuring a power consumption by the luminaire 101.

Furthermore, the luminaire 101 can comprises a vibration sensor (not shown), e.g. for detecting vibrations in the ceiling.

Preferably, the sensors 103, 105, 107, 301 and 303 are configured to forward sensor values to the controller 109. In FIG. 1b, the controller comprises a CPU.

The sensor values can comprise amplitudes of detected signals, for instance, a brightness value detected by the light sensor 103 or a velocity of a movement detected by the motion sensor.

The luminaire 101, as shown in FIG. 1b, comprises a dimmable LED driver 205 connected to the light source 113, wherein the light source 113 comprises LEDs. The controller 109 can be configured to control a dim level of the light source 113. The controller 109 can further be configured to receive information on a voltage or current consumption of the LEDs.

The wireless interface 111 can be configured to communicate with the controller 109 via the USART (Universal Synchronous/Asynchronous Receiver Transmitter) protocol.

The wireless interface 111 can be integrated in the luminaire 101 as a system on a chip (SoC).

The luminaire can further comprise a surge/burst protection unit 305.

Figure 2:
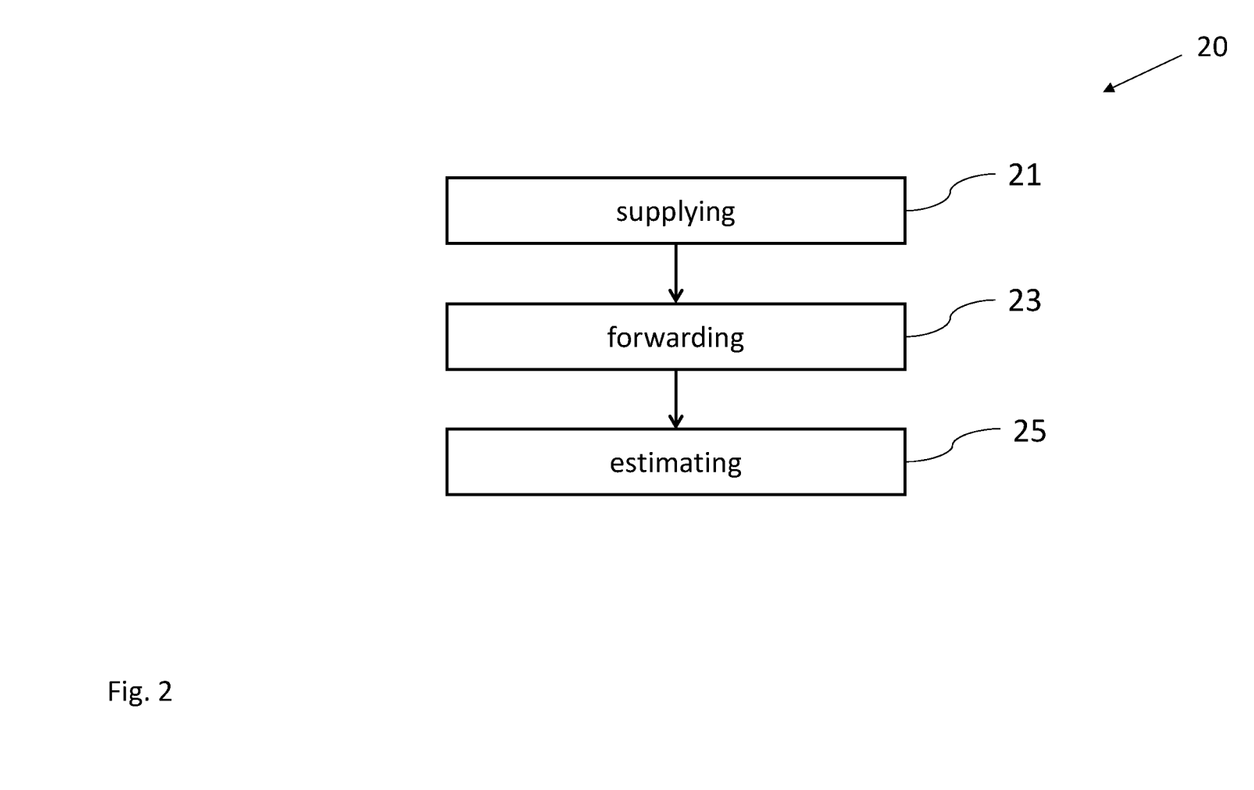
FIG. 2 shows a schematic diagram of a method for monitoring the density and/or the movement of humans according to an embodiment.

FIG. 2 shows a schematic diagram of a method 20 for monitoring the density and/or the movement of humans according to an embodiment.

The method 20 comprises using a grid 100 of a plurality of luminaires 101a-d, in particular the grid 100 of luminaires 101a-d as shown in FIG. 1a. Preferably, each of the luminaires 101a-d comprises an acoustic sensor 105, a motion sensor 107, preferably a Doppler sensor, a controller 109, and an interface 111, preferably a wireless interface, for a communication between the controller and a gateway.

The method 20 further comprises the steps of:
supplying 21 the controller 109 with the output signals of said sensors 105, 107, forwarding 23 sensor information signals, in particular based on the output signals, to a central database, and estimating 25, based on the information in the database, the density and/or the movement of humans in an area covered by the grid 100.

Preferably, the controller is arranged for forwarding the sensor information signals repetitively with a constant or a varying, especially adaptive, frequency. In particular, every new sensor information signal is based on a current output signal of said sensors 105, 107.

Preferably, the sensor information signal comprises a timestamp and/or a luminaire identifier (ID). Via the timestamp and the identifier, the density and/or movement can be correlated to a place and time in the area.

For example, the controller 109 is configured to forward a new sensor information signal every few milliseconds or at least every few seconds. In particular, the sensor information signal is forwarded with a frequency of 4 s, 1 s or 100 ms.

The wireless interface 111 can be a Bluetooth interface and can be configured to forward the sensor information signal using the Bluetooth standard.

Preferably, all audio data collected by the acoustic sensor 105 is processed in the luminaires 101a-d, in particular by the controller 109. Especially, no direct voice recordings are forwarded by the luminaires 101a-d due to hardware restrictions in each luminaire Thus, the privacy of people in the environment is respected and no audio recordings are stored. This further achieves the advantage that the sensor luminaries 101a-d can forward the sensor information signals with low bandwidth.

Preferably, the acoustic sensor 105, in particular the microphone, of each luminaire 101a-d is connected to the controller 109 for processing the sound, and the controller 109 is connected to the wireless interface 111 via the UART (Universal Asynchronous Receiver Transmitter) protocol, wherein the wireless interface 111 can be a low bandwidth radio interface.

Preferably, the controller 109 of each luminaire 101a-d is arranged for discriminating different sound categories, wherein the sensor information signal comprises the sound category. The sound category can comprise one or more of: human voice, crowd chatter, white noise, machine noise, music, street noise, traffic noise, sudden/burst noise, and broadband non-white noise. The sensor information signal can further comprises a probability value for the sound category.

The controller 109 of each luminaire 101a-d can execute an interference model based on a recursive or a convolutional neural network in order to detect the sound category, e.g. based on sound or voice features.

Preferably, the sensor information signals of each luminaire 101a-d comprises a time series of a ratio of human voices to crowd chatter indicated by a probability or intensity value. This ratio may indicate the number of people in the area. The output can further comprise a time series of sound pressure values, which also provides an indication on the number of people, and a time series of presence probability values based on a determined density of people in the vicinity of the luminaires 101a-d. In particular, the density of people and the type of the crowd in the area can be determined by calculating a moving average over the time series of the above values. The significance of these values can further be enhanced by combining different features, e.g. people density and sound pressure, linearly.

Preferably, the step of estimating 25 the density and/or movement of humans in an area covered by the grid 100 comprises:

generating a time series of sensor information signals, in particular of sensor values such as sound pressure, motion speed and/or motion intensity, of each luminaire.

Furthermore, the step of estimating 25 the density and/or the movement of humans in an area covered by the grid 100 may comprise:

determining probabilities that the sensor information signals stored in the database comprise human voice and/or multiples of human voices, for example crowd chatter, and generating a further time series of the probabilities of human voice and/or multiples of human voices.

The method 20 may further comprise the step of:

applying an averaging algorithm, convolution algorithm, smoothing algorithm, or low pass filter on the time series and/or the further time series; and/or applying an anomaly detection algorithms on the time series and/or the further time series, in particular after applying the smoothing algorithm on the respective time series, to detect outlying data.

Preferably, the method 20 comprises the further step of:

determining a peoples density probability and/or an estimate on the number of people in the area covered by the grid, in particular in an area covered by each luminaire, based on the time series and/or on the further time series.

Figure 3:
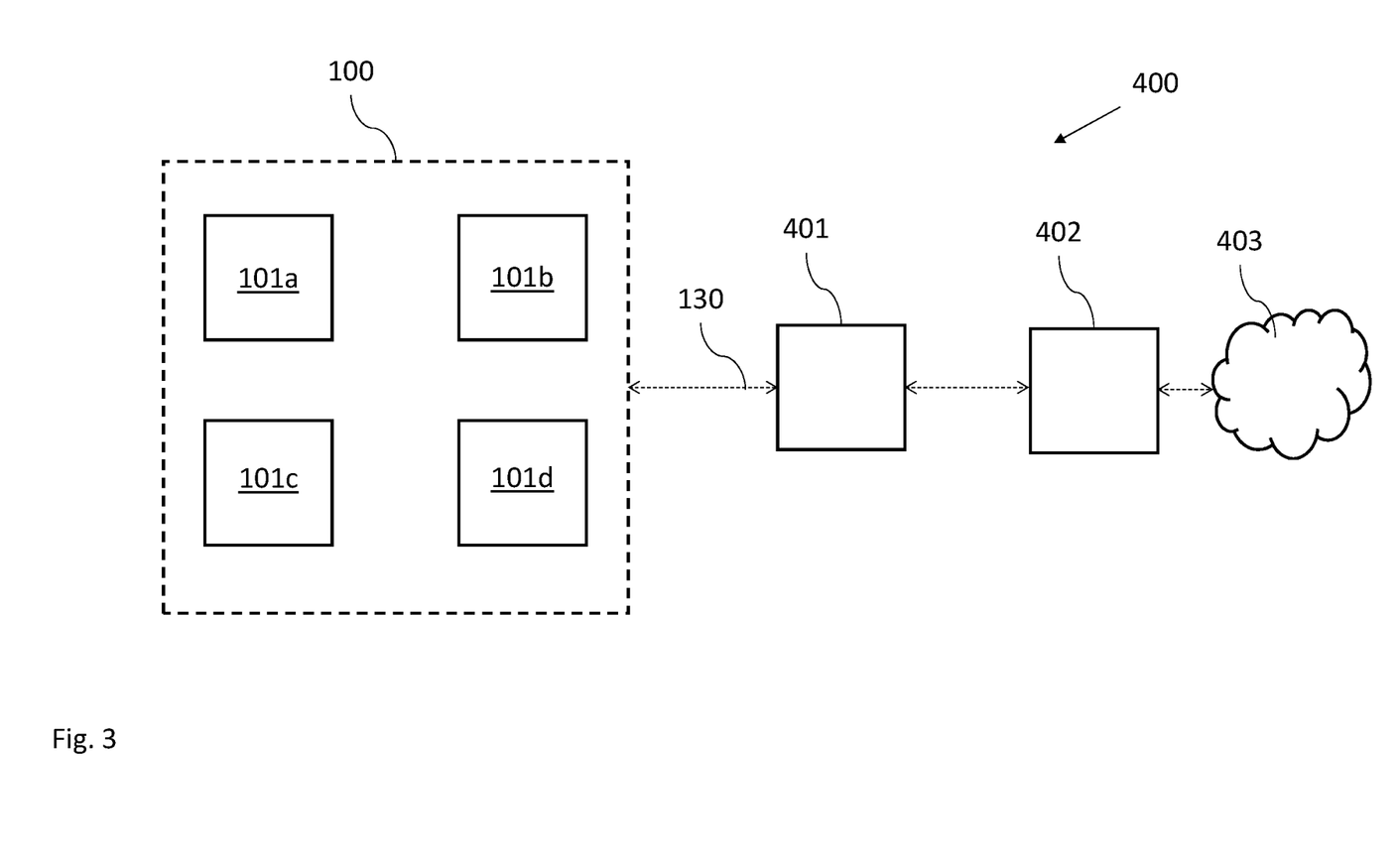
FIG. 3 shows a schematic diagram of a system comprising a grid of luminaires according to an embodiment.

The algorithms can be applied, i.e. executed, by a data processing unit, in particular the data processing unit 402 of the system 400 as shown in FIG. 3. The data processing unit can further be configured to generate the times series and further time series and/or to determine the probabilities of human voices, the peoples density probabilities or the estimate on the number of people in the area.

Preferably, based on the information stored in the database, in particular the sensor information signals, more particular on the individual sensor values, a 2D sound map of the area can be generated. For instance, the 2D sound map shows noise levels, in particular volume and/or intensity, or noise categories (human voice, chatter etc.) in the environment at different times during the day. The 2D sound map can further show an overall sound pressure in the environment and/or the presence or presence probability of people, for instance determined based on the output signal of the motion sensor 107.

In particular, the sound map can be generated as a 2D distribution based on the sensor information signals from all luminaires 101a-d of the grid 100. The sound map can further provide an estimate of the people density distribution in the area, which can be used to monitor crowd behavior, and an overall people count estimate in the area. Further features, such as probability of chatter or probability of burst noises can be used to refine the detected signals, for example for detecting emergency situations.

Preferably, the 2D sound map is a density distribution map that indicates a spatial distribution of the individual density values. The density values can be based on factors such as: magnitude of motion generated by Doppler radar, sound pattern probability, sound pattern type and sound pressure level. The combination of these values levels/magnitudes are associated with the density of people at a single location.

FIG. 3 shows a schematic diagram of a system 400 comprising a grid 100 of luminaires 101 a-d according to an embodiment.

For example, the grid 100 of the system 400 shown in FIG. 3 corresponds to the grid 100 as shown in FIG. 1a.

The system 400 further comprises the gateway 401 and the database 403. Each of the luminaires 101a-d of the system 400 comprise the acoustic sensor 105, the motion sensor 107, preferably the Doppler sensor, the controller 109 supplied with the output signals of said sensors 105, 107, and the wireless interface 111 for a communication between the controller and the gateway 401 for forwarding sensor information signals 130 to the database 403, wherein based on the information in the database 403 the density and/or the movement of humans in the area covered by the grid 100 is estimated.

Preferably, the wireless interface 111 of each one of the luminaires 101a-d in the grid 100 is configured to forwarding sensor information signals based on the output signals of the sensors 105, 107 of the respective luminaire 101a-d to the wireless gateway 401.

The gateway 401 can be configured to forward the sensor information signals 130 to the database 403. The gateway 401 can be a communication device, such as a smartphone. In particular, the gateway 401 is a wireless gateway.

The database 403 can be a memory of a data-processing device, e.g. a computer. Alternatively, the central database 403 can be a cloud storage.

Preferably, the database 403, in particular the sensor information signals 130 stored in the central database 403, can be analyzed for evaluating the time development of one or more sensor information signals 130.

Further, the database 403 can be analyzed for evaluating correlations between sensor information signals 130 of sensors 105, 107 of different categories and/or different luminaires 101a-d.

The system 400 can further comprise a data processing unit 402, e.g. a computer.

The data processing unit 402 can be configured to analyze the database 403, in particular to evaluating the time development of one or more sensor information signals 130 and/or to evaluate the correlations between sensor information signals 130.

Preferably, the sound map described above is generated based on the analysis of the database 403. For example, the data processing unit 402 is configured to generate the sound map.

In particular, the above description with regard to the luminaires 101a-d of FIG. 1a or 1b, and the method for monitoring the density and the movement of people of FIG. 2 is correspondingly valid for the system 400 of FIG. 3.

Figure 4:
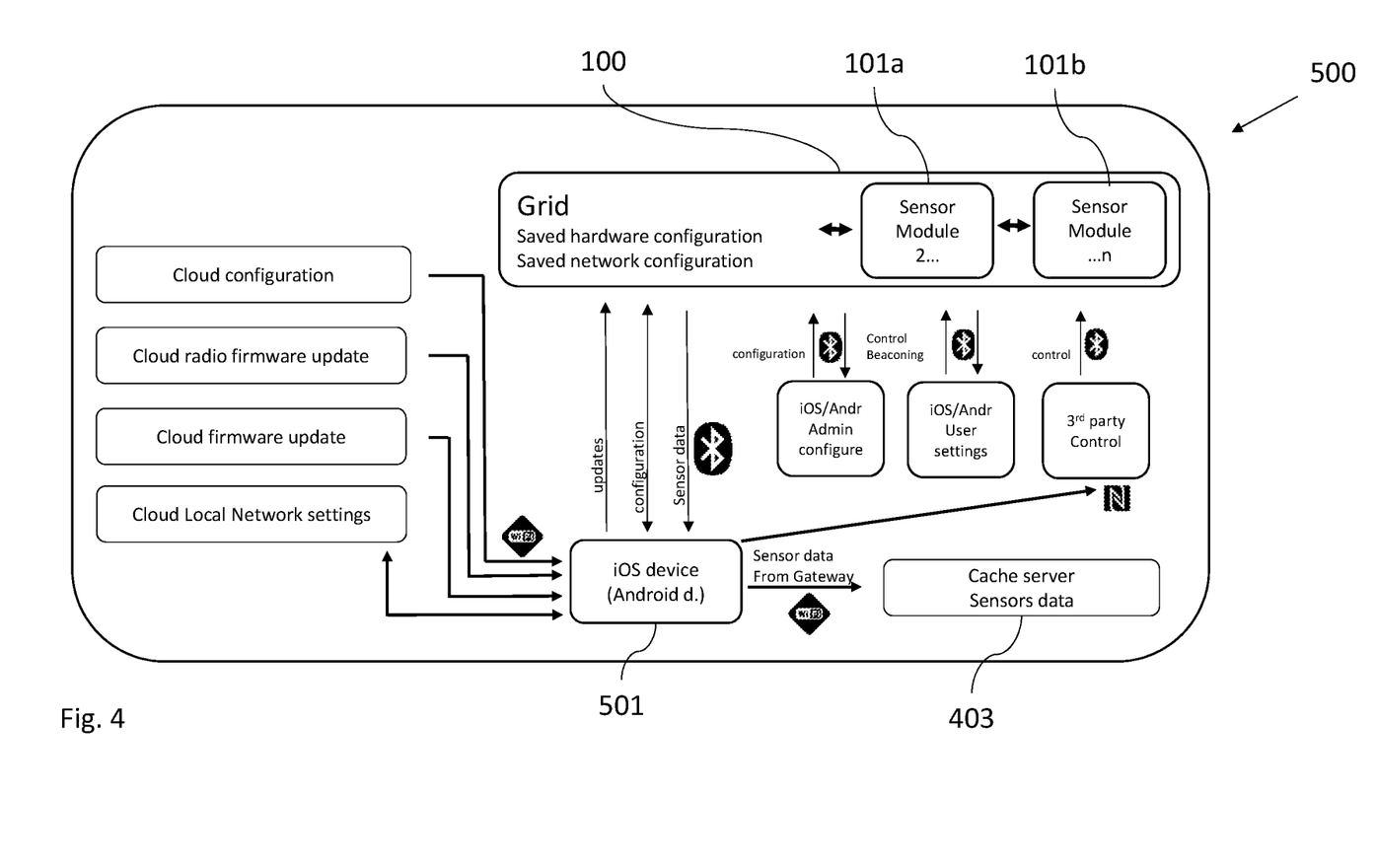
FIG. 4 shows a schematic diagram of a system comprising a grid of luminaires according to a further embodiment.

FIG. 4 shows a schematic diagram of a system 500 comprising the grid 100 of luminaires 101a-b according to a further embodiment. In particular, the system 500 shown in FIG. 5 corresponds to the system 400 shown in FIG. 4.

The system 500 shown in FIG. 5 comprises the grid 100, the central database 403 and a communication device 501, in particular a smartphone. The communication device 501 can be configured to establish a communication connection, in particular a Bluetooth connection, with the wireless interfaces 111 of the luminaires 101a-d of the grid 100.

Preferably, each luminaires 101a-d of the grid 100 may form a building technology sensor module. The grid 100 can be a grid of such sensor modules.

The grid 100 can be configured to receive update data, such as cloud (radio) firmware updates, and/or configuration data, such as user settings or local network settings, from the communication device 501.

The grid 100 can further be configured to forward configuration and/or sensor data to the communication device 501. The communication device 501 can be configured to forward this data, in particular the sensor data, to the central database 403, e.g. a cache server.

In a preferred embodiment, the communication device 501 may be configured to forward the configuration and/or sensor data to the wireless gateway 401. In an alternative embodiment, the communication device 501 may correspond to the wireless gateway 401.

The communication device 501 can be configured to initially receive the configuration and update data from an external source, e.g. via a WiFi connection.

The communication device 501 can further be configured to initiate a third parity control of the grid 100, e.g. by providing a third party device with necessary credentials via NFC.

All features of all embodiments described, shown and/or claimed herein can be combined with each other.

While various embodiments of the present invention have been described above, it should be understood that they have been presented by way of example only and not limitation. Numerous changes to the disclosed embodiments can be made in accordance with the disclosure herein without departing from the spirit of scope of the invention. Thus, the breadth and scope of the present invention should not be limited by any of the above-described embodiments. Rather, the scope of the invention should be defined in accordance with the following claims and their equivalence.

Although the invention has been illustrated and described with respect to one or more implementations, equivalent alternations and modifications will occur to those skilled in the art upon the reading of the understanding of the specification and the annexed drawings. In addition, while a particular feature of the invention may have been disclosed with respect to only one of the several implementations, such features may be combined with one or more other features of the other implementations as may be desired and advantage for any given or particular application.

The invention claimed is:

1. A method (20) for monitoring the density and/or the movement of humans using a grid (100) of a plurality of luminaires (101a-d), each of the luminaires (101a-d) comprising:
    an acoustic sensor (105),
    a motion sensor (107), preferably a Doppler sensor,
    a controller (109) supplied with output signals of said sensors (105, 107), and
    an interface (111) for a communication between the controller (109) and a gateway (401) for forwarding sensor information signals (130) to a central database (403),
    wherein, based on the information in the database (403), the density and/or the movement of humans in an area covered by the grid (100) is estimated by generating a time series of sensor values of each luminaire (101a-d), said sensor information signals (130) comprise a timestamp, a luminaire identifier and a sensor value, and the sensor value represents an amplitude of the output signal at the time of the associated timestamp.

2. The method (20) of claim 1, wherein the controller (109) is arranged for forwarding the sensor information signals (130) repetitively with a constant or a varying frequency.

3. The method (20) of claim 1, wherein said sensor information signals (130) are forwarded using the Bluetooth standard.

4. A method (20) for monitoring the density and/or the movement of humans using a grid (100) of a plurality of luminaires (101*a-d*), each of the luminaires (101*a-d*) comprising:
- an acoustic sensor (105),
- a motion sensor (107),
- a controller (109) supplied with output signals of said sensors (105, 107), and
- an interface (111) for a communication between the controller (109) and a gateway (401) for forwarding sensor information signals (130) to a central database (403), wherein, based on the information in the database (403), the density and/or the movement of humans in an area covered by the grid (100) is estimated by generating a time series of sensor values of each luminaire (101*a-d*), wherein the density and/or the movement of humans in the area covered by the grid (100) are estimated by:
- determining probabilities that the sensor information signals (130) stored in the database (403) comprise human voice and/or multiples of human voices, and
- generating a further time series of the probabilities of human voice and/or multiples of human voices.

5. A method (20) for monitoring the density and/or the movement of humans using a grid (100) of a plurality of luminaires (101*a-d*), each of the luminaires (101*a-d*) comprising:
- an acoustic sensor (105),
- a motion sensor (107),
- a controller (109) supplied with output signals of said sensors (105, 107), and
- an interface (111) for a communication between the controller (109) and a gateway (401) for forwarding sensor information signals (130) to a central database (403), wherein, based on the information in the database (403), the density and/or the movement of humans in an area covered by the grid (100) is estimated by generating a time series of sensor values of each luminaire (101*a-d*), wherein the method (20) further comprises:

applying an averaging algorithm, convolution algorithm, smoothing algorithm, or low pass filter on the time series and/or the further time series.

6. A method (20) for monitoring the density and/or the movement of humans using a grid (100) of a plurality of luminaires (101*a-d*), each of the luminaires (101*a-d*) comprising:
- an acoustic sensor (105),
- a motion sensor (107),
- a controller (109) supplied with output signals of said sensors (105, 107), and
- an interface (111) for a communication between the controller (109) and a gateway (401) for forwarding sensor information signals (130) to a central database (403),
- wherein, based on the information in the database (403), the density and/or the movement of humans in an area covered by the grid (100) is estimated by generating a time series of sensor values of each luminaire (101*a-d*), wherein the method (20) further comprises: applying an anomaly detection algorithm on the time series and/or the further time series, after applying the smoothing algorithm on the respective time series, to detect outlying data.

7. A method (20) for monitoring the density and/or the movement of humans using a grid (100) of a plurality of luminaires (101*a-d*), each of the luminaires (101*a-d*) comprising:
- an acoustic sensor (105),
- a motion sensor (107),
- a controller (109) supplied with output signals of said sensors (105, 107), and
- an interface (111) for a communication between the controller (109) and a gateway (401) for forwarding sensor information signals (130) to a central database (403), wherein, based on the information in the database (403), the density and/or the movement of humans in an area covered by the grid (100) is estimated by generating a time series of sensor values of each luminaire (101*a-d*), wherein the method (20) further comprises: determining a people density probability and/or an estimate on the number of people in the area covered by the grid, in an area covered by each luminaire, based on the time series and/or on the further time series.

8. The method (20) of claim 1 wherein the interface (111) for communication between the controller (109) and a gateway (401) is a wireless interface.

9. The method (20) of claim 2 wherein the controller (109) is arranged for forwarding the sensor information signals (130) repetitively with an adaptive frequency.

* * * * *

UNITED STATES PATENT AND TRADEMARK OFFICE
CERTIFICATE OF CORRECTION

PATENT NO. : 12,167,520 B2
APPLICATION NO. : 17/910127
DATED : December 10, 2024
INVENTOR(S) : Istvan Bakk Page 1 of 1

It is certified that error appears in the above-identified patent and that said Letters Patent is hereby corrected as shown below:

In the Claims

Claim 1, Column 10, Line 44, After "(107)," delete "preferably a Doppler sensor,"

Signed and Sealed this
Seventh Day of January, 2025

Derrick Brent
*Acting Director of the United States Patent and Trademark Office*